Patented Apr. 22, 1941

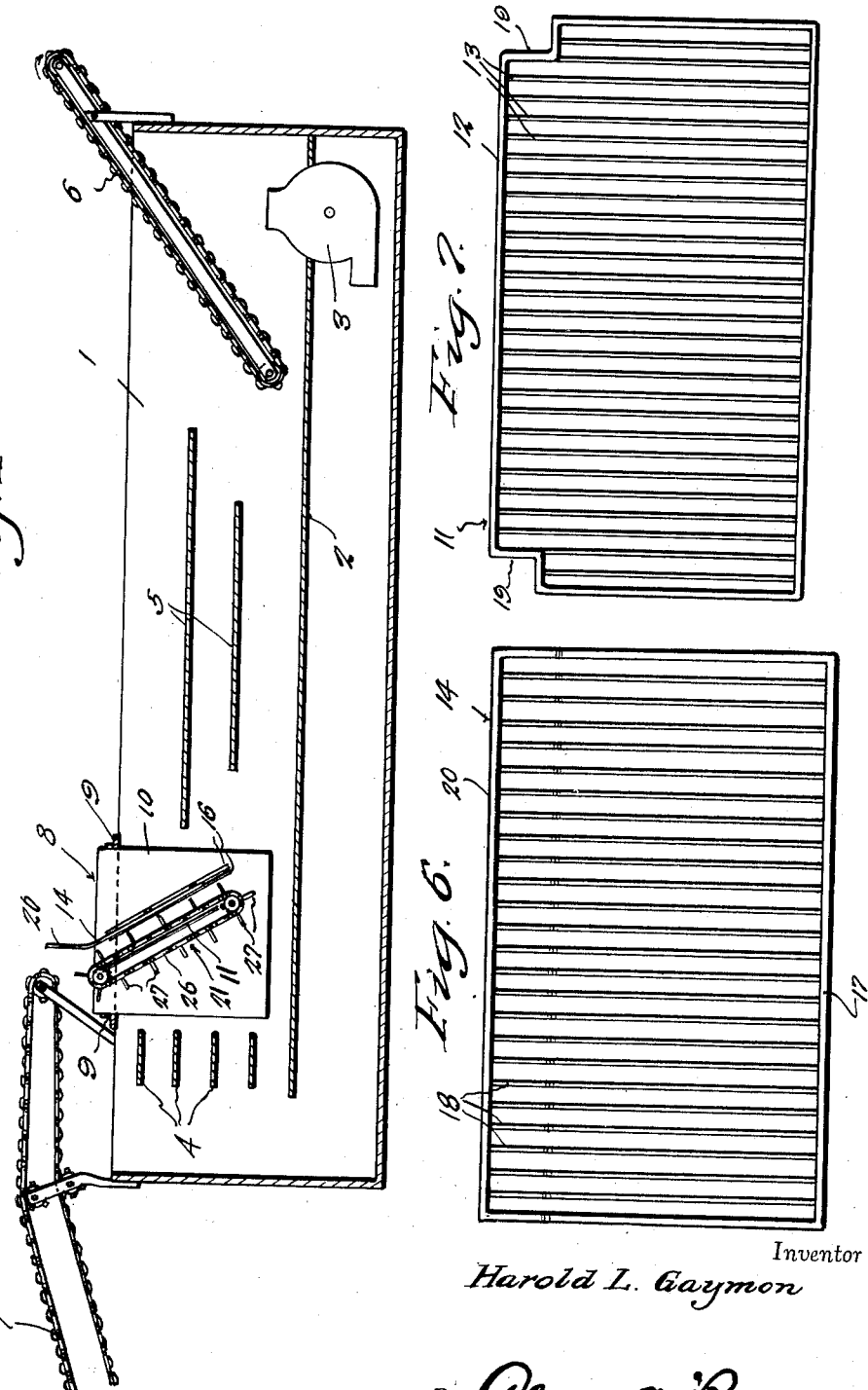

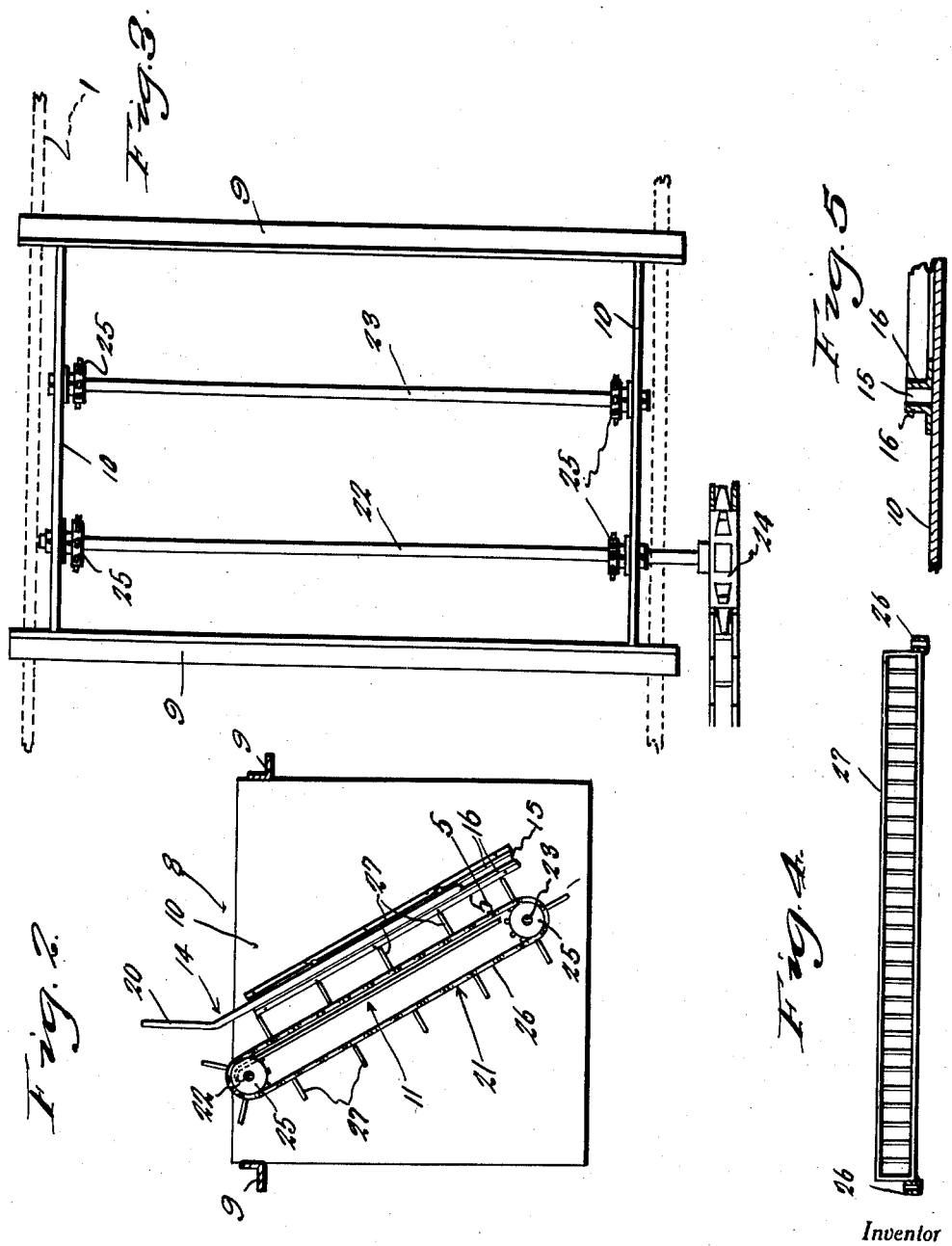

2,238,997

UNITED STATES PATENT OFFICE 2,238,997

FRUIT SEPARATOR

Harold L. Gaymon, Bartow, Fla.

Application May 7, 1940, Serial No. 333,829

3 Claims. (Cl. 209—173)

This invention relates to new and useful improvements in means for separating dry or frozen fruit from unfrozen or normally juicy fruit by the specific gravity method and has for its primary object to provide, in a manner as hereinafter set forth, a device embodying a novel construction and arrangement whereby the fruit to be separated will be positively submerged to a predetermined uniform depth in the fluid before said fruit is released.

Another very important object of the invention is to provide submerging means of the aforementioned character for fruit separators which may be conveniently adjusted to release the fruit at any desired depth.

Still another important object of the invention is to provide a submerging device of the character described for fruit separators which is adapted to be expeditiously mounted in position for use on the usual tank of an apparatus of this character or which, if desired, may be incorporated in the separating apparatus as a permanent or built-in-part thereof.

Other objects of the invention are to provide a fruit submerging device for separators of the specific gravity type which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical longitudinal section through a fruit separator, showing a submerging device or unit constructed in accordance with the present invention mounted thereon.

Figure 2 is a view in vertical longitudinal section through a side portion of the submerging unit.

Figure 3 is a top plan view of the submerging unit with parts omitted.

Figure 4 is a view in horizontal section through one side or flight of the endless conveyor of the submerging unit.

Figure 5 is a detail view in section, taken substantially on the line 5—5 of Fig. 2.

Figure 6 is a detail view in elevation of the adjustable panel which controls the depth at which the fruit is released in the fluid.

Figure 7 is a detail view in elevation of the stationary panel which complements that shown in Fig. 6.

Referring now to the drawings in detail, it will be seen that the reference numeral 1 designates an elongated tank of any desired dimensions for the reception of a suitable fluid. The tank 1 has mounted therein what may be referred to as a false bottom 2 extending from the forward end of said tank to a point in spaced relation to its rear end. Mounted in the forward end portion of the false bottom 2 is a pump 3 through the medium of which the fluid is caused to circulate, said pump being driven from any suitable source of power. Mounted in the tank 1 above the rear end portion of the false bottom 2 is a plurality of vertically spaced fluid guide vanes or baffles 4. Mounted in an intermediate portion of the tank 1 are one or more vertically spaced, horizontal separating screens or partitions 5. The reference numeral 6 designates an endless conveyor on the forward end portion of the tank 1 which receives and carries off the fruit after it has passed through the apparatus. If desired, the separating partitions 5 may be provided with suitable guides (not shown) for directing the dry or frozen, the normally juicy or unfrozen and the partially dry or partially frozen fruit toward different portions of the conveyor 6.

Mounted on the rear end portion of the tank 1 is a fruit delivery or feeding conveyor 7 of the endless type. Of course, the conveyor 7 may be driven from any suitable source of power, also the conveyor 6. Suspended in the tank 1, between the members 4 and 5 and below the discharge end of the conveyor 7 for receiving fruit therefrom, is a submerging device or unit which is designated generally by the reference numeral 8. As best seen in Figs. 1 and 3 of the drawings, the submerging unit 8 comprises a pair of transverse angle iron supporting bars 9 which are adapted to rest on the upper edges of the side walls of the tank 1. Mounted between the bars 9 and depending therefrom adjacent the side walls of the tank 1 are plates 10. Extending between the side plates 10 is an inclined panel which is designated generally by the reference numeral 11. The panel 11, it will be observed, is substantially in the form of a grid (see Fig. 7) and comprises a metal frame 12 having mounted therein spaced, parallel, vertical rods 13.

Adjustably mounted between the side plates 10, in spaced, opposed relation to the stationary panel 11, is a panel 14. The panel 14 is slidable in grooves or channels 15 (see Fig. 5) which are defined by pairs of guides 16 mounted on the side plates 10. As illustrated to advantage in Fig. 6 of the drawings, the panel 14 comprises a metallic frame 17 having mounted therein spaced, parallel rods 18. The upper portion 20 of the panel 14 is substantially vertical. The panels 11 and 14, in conjunction with the side plates 10, provide an inclined tube or chute located beneath the discharge end of the conveyor 7.

The submerging unit 8 further comprises an endless conveyor which is designated generally by the reference numeral 21, one flight of which travels between the panels 11 and 14 adjacent the former. The conveyor 21 comprises upper and lower shafts 22 and 23, respectively, journaled in suitable bearings provided therefor in the side plates 10. A chain and sprocket drive 24 is provided on one end of the upper shaft 22. It may be well to here state that the conveyors 7 and 21 are to be synchronized in any suitable manner to travel in unison at the desired speed. Sprocket wheels 25 are fixed on the end portions of the shafts 22 and 23 and trained thereover are endless sprocket chains 26. Grill type vanes 27 (see Fig. 4) are mounted on the chains 26 and project at right angles therefrom. The upper corner portions of the stationary panel 11 are recessed, as at 19, to accommodate the sprocket wheels 25 on the upper shaft 22. Also, as indicated in dotted lines in Fig. 2 of the drawings, the upper portion of the stationary panel 11 is curved rearwardly over the upper shaft 22.

It is thought that the operation of the device will be readily apparent from a consideration of the foregoing. Briefly, with the conveyors 21 and 7 synchronized, the fruit to be separated is discharged from said conveyor 7 into the unit 8. The fruit is arranged in transverse rows on the conveyor 7 and each vane 27 of the conveyor 21 is to receive one of such rows. The construction and arrangement is such that the fruit drops into the inclined tube or conduit defined by the members 11, 14 and 10. The grill type vanes 27 of the conveyor 21 carry the fruit downwardly in the forwardly circulating stream of fluid in the tank 1 until the lower end of the panel 14 is reached. At this point the fruit is released and, of course, moves forwardly and upwardly in the fluid. The separating partitions 5 then function in the usual manner. Of course, by simply adjusting the panel 14 in the guides 16 the depth at which the fruit will be released may be conveniently regulated as desired. Suitable means may be provided, if necessary, for securing the panel 14 in adjusted position. It will be observed that the construction and arrangement is such that the unit 8 may be expeditiously mounted on the tank and removed therefrom for use elsewhere. However, the elements comprising the unit 8 may be permanently incorporated in the separating tank if desired.

It is believed that the many advantages of a frozen fruit separator constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

1. A submerging unit for specific gravity fruit separators of the type including an elongated tank for the reception of a fluid, comprising supporting bars resting transversely on the tank, side plates mounted between the supporting bars and depending therefrom in the tank, guides mounted on the side plates, a pair of inclined, foraminous panels mounted between the side plates in spaced, opposed relation to each other, the upper panel extending from a point above the top of the tank downwardly well below the fluid level but terminating a substantial distance above the tank bottom and being slidable in the guides to adjust its lower end with respect to said bottom, said panels, in conjunction with the side plates, defining a tube for the reception of the fruit, and an endless conveyor engageable with the fruit for carrying said fruit through the tube, one flight of said conveyor being operable in the tube.

2. A submerging unit for specific gravity fruit separators of the type including a tank for the reception of a fluid, comprising a pair of side plates, means for suspending said plates in the tank, pairs of inclined guides on said plates, a pair of spaced, opposed, inclined panels mounted on the plates, the upper panel extending from a point above the top of the tank downwardly well below the fluid level but terminating a substantial distance above the tank bottom and being slidable in the guides to adjust its lower end with respect to said bottom and an endless conveyor mounted on the plates, one of the flights of said conveyor being operable between the panels for moving fruit downwardly therebetween.

3. Submerging means for specific gravity fruit separators of the type including a tank for the reception of a fluid, comprising guides mounted in the tank, a pair of spaced, opposed panels mounted in the tank, one of said panels extending from a point above the top of the tank downwardly well below the fluid level but terminating a substantial distance above the tank bottom and being slidable in the guides for adjusting its lower end with respect to said bottom, and an endless conveyor having one of its flights operable between the panels for moving fruit to be separated downwardly therebetween.

HAROLD L. GAYMON.